US008013828B2

(12) United States Patent
Oomura et al.

(10) Patent No.: US 8,013,828 B2
(45) Date of Patent: Sep. 6, 2011

(54) LIQUID CRYSTAL DISPLAY APPARATUS, METHOD OF CONTROLLING THE SAME, AND LIQUID CRYSTAL PROJECTOR SYSTEM

(75) Inventors: Masanobu Oomura, Yokohama (JP); Hiroaki Kameyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 12/061,280

(22) Filed: Apr. 2, 2008

(65) Prior Publication Data
US 2008/0259229 A1  Oct. 23, 2008

(30) Foreign Application Priority Data

Apr. 23, 2007  (JP) ................................. 2007-113271

(51) Int. Cl.
G09G 3/36  (2006.01)
(52) U.S. Cl. ......................................... 345/100; 345/87
(58) Field of Classification Search .................... 345/87, 345/100
See application file for complete search history.

(56) References Cited

U.S. PATENT DOCUMENTS

| 5,892,493 A * | 4/1999 | Enami et al. ..................... 345/94 |
| 7,233,302 B2 * | 6/2007 | Ishizuka ........................... 345/77 |
| 7,271,801 B2 * | 9/2007 | Toyozawa et al. ............. 345/211 |
| 2004/0051688 A1 * | 3/2004 | Orii et al. ......................... 345/87 |
| 2006/0007193 A1 * | 1/2006 | Yamashita et al. ............. 345/204 |
| 2007/0035492 A1 * | 2/2007 | Chang .............................. 345/87 |
| 2007/0091040 A1 * | 4/2007 | Wu .................................. 345/87 |
| 2007/0279353 A1 | 12/2007 | Oomura .......................... 345/87 |

FOREIGN PATENT DOCUMENTS
JP  2004-226597  8/2004

OTHER PUBLICATIONS

Kimio et al., Machine translation of Japanese Patent Publication No. JP2004-226597, Published Aug. 12, 2004.*

* cited by examiner

Primary Examiner — Richard Hjerpe
Assistant Examiner — Christopher Thompson
(74) Attorney, Agent, or Firm — Fitzpatrick, Cella, Harper & Scinto (57) ABSTRACT

A liquid crystal display apparatus includes a display area in which pixels each having a switching element and electrode are arranged forming a matrix; a first scanning circuit to control whether the switching elements are turned on or off via first wires; a second scanning circuit to control whether an image signal generating circuit is electrically connected to or disconnected from second wires, and to assign image signals to the pixels via those wires; a discharging element to discharge the assigned image signals; a detecting circuit to detect reduction in a power supply voltage and to output a detection signal; and a control circuit to perform a controlling operation according to the signal so that the image signal generating circuit is electrically disconnected from the second wires, the switching elements are turned on, and the discharging element is caused to operate.

7 Claims, 5 Drawing Sheets

LIQUID CRYSTAL DISPLAY APPARATUS, METHOD OF CONTROLLING THE SAME, AND LIQUID CRYSTAL PROJECTOR SYSTEM

BACKGROUND OF THE INVENTION

1. Field of the Invention

The present invention relates to liquid crystal display apparatuses, and particularly to techniques that are effective for discharging charges from pixels at the time of power-off or the like.

2. Description of the Related Art

In a liquid crystal display apparatus, if power is turned off with charging remaining at pixels, the liquid crystal display apparatus is left for a long period with a DC voltage applied to a liquid crystal layer. This causes image sticking, which results in reduction of the lifespan (reliability) of the liquid crystal. Therefore, at the time of power-off, charges remaining at the pixels (remaining charges) must be discharged quickly.

In a first method according to the related art, in order to discharge remaining charges at the time of power off, before the liquid crystal display apparatus is powered off, a white signal (or a black signal) is written by controlling timing of writing to the panel. In a second method according to the related art, reduction in a power supply voltage is monitored, switching transistors of the pixels are simultaneously turned on according to the result of monitoring, and the remaining charges are discharged via discharging switches provided in association with a plurality of data signal lines (hereinafter referred to as signal lines) connected to the pixels.

According to the first method, timing pulses for writing data to the panel must be generated, and timing of power-off after the writing must be managed. This requires complex timing control.

The second method is described in Japanese Patent Laid-Open No 2004-226597. According to the second method, without requiring complex timing control, remaining charges can be discharged quickly. According to Japanese Patent Laid-Open No 2004-226597, a liquid crystal display apparatus includes a detecting circuit configured to detect reduction in a power supply voltage in the liquid crystal display apparatus and to output a detection signal, and a plurality of discharging elements connected individually in series with a plurality of data lines, configured to turn on according to the detection signal so that the data lines are discharged. Furthermore, when the detecting circuit has detected power-off of the power supply voltage, a gate control circuit controls a voltage applied to the gates of a plurality of switching transistors so that the switching transistors are simultaneously turned on.

SUMMARY OF THE INVENTION

The related art described above, however, has had the following shortcoming. According to the configuration described in Japanese Patent Laid-Open No. 2004-226597, a discharging signal that is output on the basis of detection of reduction in the power supply voltage turns on the discharging switches connected to the plurality of data signal lines, whereby the signal lines are discharged to a desired potential (discharged potential). However, Japanese Patent Laid-Open No. 2004-226597 does not make clear the relationship between the discharging signal and the state of selector switches (hereinafter referred to as transferring switches) that connect the signal lines with a driver circuit (source driver) for driving the signal lines.

If one or more discharging switches are turned on according to the discharging signal while the source driver is supplying a voltage of 10V or higher to the signal lines, and if the discharged potential is the ground potential (GND), the output of the source driver becomes short circuited with GND via the transferring switches and the signal lines. This causes an excessive load of the output circuit of the source driver (i.e., an excessive current flows), possibly causing damage to the output circuit.

According to the present invention, at the time of power-off or the like of a liquid crystal display apparatus, charges remaining at pixels can be discharged quickly without causing an excessive load of an image signal generating circuit (source driver).

According to an aspect of the present invention, there is provided a liquid crystal display apparatus including a display area in which a plurality of pixels are arranged to form a matrix, each of the pixels having a switching element and an electrode connected to a first terminal of the switching element; a first scanning circuit configured to control whether the switching elements of the pixels are turned on or off via a plurality of first wires; a second scanning circuit configured to control whether an image signal generating circuit that generates image signals is electrically connected to or disconnected from a plurality of second wires, and to assign the image signals to the pixels via the second wires; a discharging element configured to discharge the image signals assigned to the pixels; a detecting circuit configured to detect reduction in a power supply voltage and to output a detection signal; and a control circuit configured to perform a controlling operation according to the detection signal so that the image signal generating circuit is electrically disconnected from the second wires, the switching elements are turned on, and the discharging element is caused to operate.

According to another aspect of the present invention, there is provided a method of controlling a liquid crystal display apparatus including a display area in which a plurality of pixels are arranged to form a matrix, each of the pixels having a switching element and an electrode connected to a first terminal of the switching element; a first scanning circuit configured to control whether the switching elements are turned on or off via a plurality of first wires; a second scanning circuit configured to control whether an image signal generating circuit that generates image signals is electrically connected to or disconnected from a plurality of second wires, and to assign the image signals to the pixels via the second wires; a discharging element configured to discharge the image signals assigned to the pixels; and a detecting circuit configured to detect reduction in a power supply voltage and to output a detection signal, the method including a control step of performing a controlling operation according to the detection signal so that the image signal generating circuit is electrically disconnected from the second wires, the switching elements are turned on, and the discharging element is caused to operate.

According to the present invention, the output of the image signal generating circuit does not become short circuited with a reference voltage. Accordingly, without damaging the image signal generating circuit, voltages stored at pixels can be discharged quickly. This serves to prevent reduction of lifespan (reliability).

Further features of the present invention will become apparent from the following description of exemplary embodiments with reference to the attached drawings.

DESCRIPTION OF THE EMBODIMENTS

Now, embodiments of the present invention will be described in detail with reference to the drawings.

First Embodiment

Figure 1:
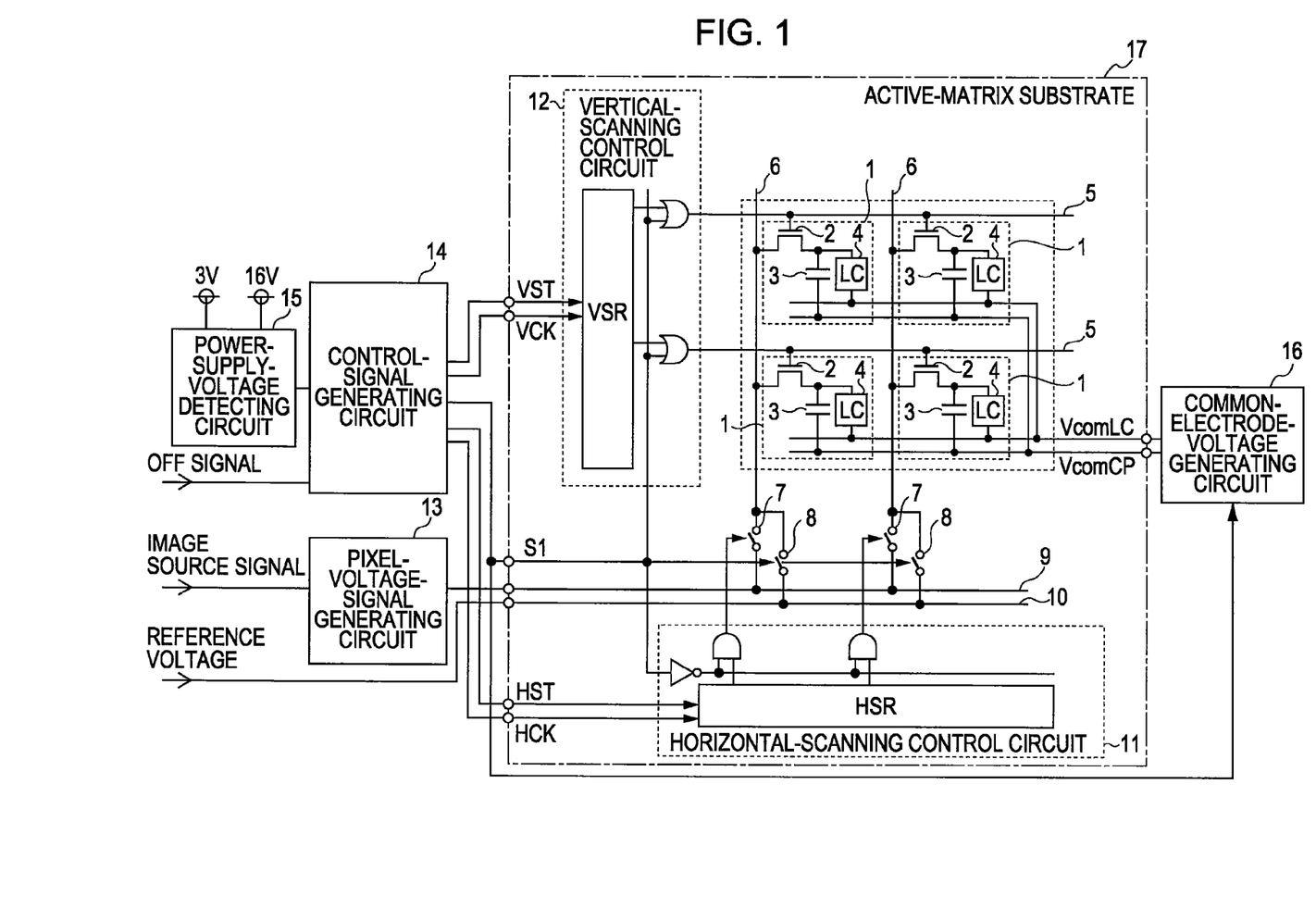
FIG. 1 is a schematic circuit diagram showing an example configuration of a liquid crystal display apparatus according to a first embodiment of the present invention.

FIG. 1 is a diagram showing an example configuration of a liquid crystal display apparatus according to a first embodiment of the present invention. Referring to FIG. 1, a display area is formed of unit pixels 1. Each of the pixels 1 is formed of a pixel transistor 2 that serves as a switching element, a pixel storage capacitor 3, and a liquid crystal 4. A counter electrode of the pixel storage capacitors 3 is formed commonly for all the pixels 1. Although not shown, an electrode is provided at an end where the pixel transistor 2 and the pixel storage capacitor 3 are connected to each other, and the liquid crystal 4 is disposed between the electrode and an electrode provided commonly for all the pixels 1 (usually formed of a transparent electrode).

The counter electrode of the pixel storage capacitor 3 and the common electrode holding the liquid crystal 4, described above, are both connected to a common electrode voltage generating circuit 16 provided outside an active matrix substrate 17. A voltage VcomCP is fed to the counter electrode of the pixel storage capacitor 3, and a voltage VcomLC is fed to the common electrode holding the liquid crystal 4.

Among the pixels 1 forming a matrix of M rows×N columns, the gates of the pixel transistors 2 on the same row are commonly connected to a gate line 5 on a row by row basis, and the sources of the pixel transistors 2 on the same column are commonly connected to a signal line 6 on a column by column basis.

The gate lines 5 are controlled by a vertical scanning control circuit 12 provided on the active matrix substrate 17. Each of the signal lines 6 is connected to a first switch (hereinafter referred to as a transferring switch) 7 and a second switch (hereinafter referred to as a discharging switch) 8. The other end of the transferring switch 7 is connected to a video line 9 that transmits signals output from a pixel voltage signal generating circuit 13 provided outside the active matrix substrate 17. The other end of the discharging switch 8 is connected to a reference voltage line 10 that transmits a reference voltage fed from the outside of the active matrix substrate 17. The pixel voltage signal generating circuit 13 receives input of signals of an image source that is to be displayed.

The reference voltage serves as a reference discharged voltage at the time of discharging voltages stored in the pixel storage capacitors 3, for example, when the liquid crystal display apparatus is powered off. The control terminals of the transferring switches 7 are controlled by a horizontal scanning control circuit 11. Furthermore, the control terminals of all the discharging switches 8 receive input of a control signal S1 output from a control signal generating circuit 14 provided outside the active matrix substrate 17.

In addition to the control signal S1, the control signal generating circuit 14 outputs a vertical scanning start signal VST, a vertical scanning clock signal VCK, a horizontal scanning start signal HST, and a horizontal scanning clock signal HCK.

The vertical scanning control circuit 12 is formed of a vertical shift register VSR and OR circuits, and the vertical scanning start signal VST and the vertical scanning clock signal VCK are input to the vertical shift register VSR. Output signals of the vertical shift register VSR and the control signal S1 are input to the OR circuits, and output signals of the OR circuits are fed to the gate lines 5.

The horizontal scanning control circuit 11 is formed of a horizontal scanning shift register HSR, AND circuits, and an inverter circuit, and the horizontal scanning start signal HST and the horizontal scanning clock signal HCK are input to the horizontal scanning shift register HSR. The control signal S1 is input to the inverter circuit, an output signal of the inverter circuit and output signals of the horizontal scanning shift register HSR are input to the AND circuits, and output signals of the AND circuits are used to control the transferring switches 7 of the individual columns.

The control signal S1 output from the control signal generating circuit 14 is also fed to the common electrode voltage generating circuit 16 described earlier. Although not shown, the control signal generating circuit 14 also outputs another control signal to the pixel voltage signal generating circuit 13 for the purpose of synchronization with vertical scanning and horizontal scanning.

The control signal generating circuit 14 receives input of an output signal of a power supply voltage detecting circuit 15 that detects power supply voltages of the liquid crystal display apparatus, and an OFF signal from a main unit of a product including the liquid crystal display apparatus.

For example, the power supply voltage detecting circuit 15 detects a power supply voltage of 3 V for logic circuits and a power supply voltage of 16 V for liquid crystal driving circuits, and outputs a detection signal to the control signal generating circuit 14 upon detecting that one of the power supply voltages has dropped to a certain voltage or below.

Next, an operation according to a method of controlling the liquid crystal display apparatus of this embodiment will be described. When a sequence for discharging voltages stored at the pixel storage capacitors 3 is executed in response to an OFF signal transmitted from the main unit of the product or a signal output from the power supply voltage detecting circuit 15, the control signal generating circuit 14 pulls the control signal S1 to a high level.

According to the control signal S1, the discharging switches 8 connected to the signal lines 6 of the individual columns and the pixel transistors 2 of the individual pixels 1 are all forcibly turned on simultaneously. Furthermore, the transferring switches 7 are all forcibly turned off simultaneously. Accordingly, the storage capacitors 3 are discharged so that voltages stored at the storage capacitors 3 of all the pixels 1 are controlled to become a desired reference voltage. At the same time, the voltages VcomCP and VcomLC output from the common electrode voltage generating circuit 16 are controlled to become predetermined voltages.

With the configuration according to this embodiment, even if one or more of the transferring switches 7 are ON during a horizontal scanning operation, the transferring switches 7 are forcibly turned off according to the control signal S1, so that the pixel voltage signal generating circuit 13 is electrically disconnected from the signal lines 6. Therefore, the output terminal of the pixel voltage signal generating circuit 13 does not become short circuited with the reference voltage via the transferring switches 7 and the discharging switches 8, so that the pixel voltage signal generating circuit 13 can be protected from being damaged by an excessive load.

Furthermore, considering the transient state during execution of the discharging sequence, it is desired that the transferring switches 7 be turned off before the discharging switches 8 and the pixel transistors 2 are turned on. With this order of operation, excessive load of the pixel voltage signal generating circuit 13 can be prevented more reliably. These switches can be caused to operate in the above described order in the following manner. For example, a delaying circuit may be provided on the active matrix substrate 17 so that the control signal S1 is input to the delaying circuit and the horizontal scanning control circuit 11 and a delayed version output from the delaying circuit is input to the discharging switches 8 and the vertical scanning control circuit 12. Alternatively, the control signal generating circuit 14 internally generates and outputs an undelayed version and a delayed version of the control signal S1, and inputs the undelayed version to the horizontal scanning control circuit 11 and inputs the delayed version to the discharging switches 8 and the vertical scanning control circuit 12.

In the configuration according to this embodiment, the horizontal scanning control circuit 11 is formed of the shift register HSR, the AND circuits, and the inverter circuit. However, without limitation to this configuration, other configurations are possible. For example, the horizontal scanning control circuit 11 may be formed using a shift register having a reset function, using the control signal S1 as a reset signal to simultaneously pull output signals of the horizontal scanning control circuit 11 to a low level.

Furthermore, although the vertical scanning control circuit 12 is formed of the shift register VSR and the OR circuits, without limitation to this configuration, other configurations are possible. For example, the vertical scanning control circuit 12 may be formed using a shift register having a set function, using the control signal S1 as a set signal to simultaneously pull output signals of the vertical scanning control circuit 12 to a high level.

Second Embodiment

Figure 2:
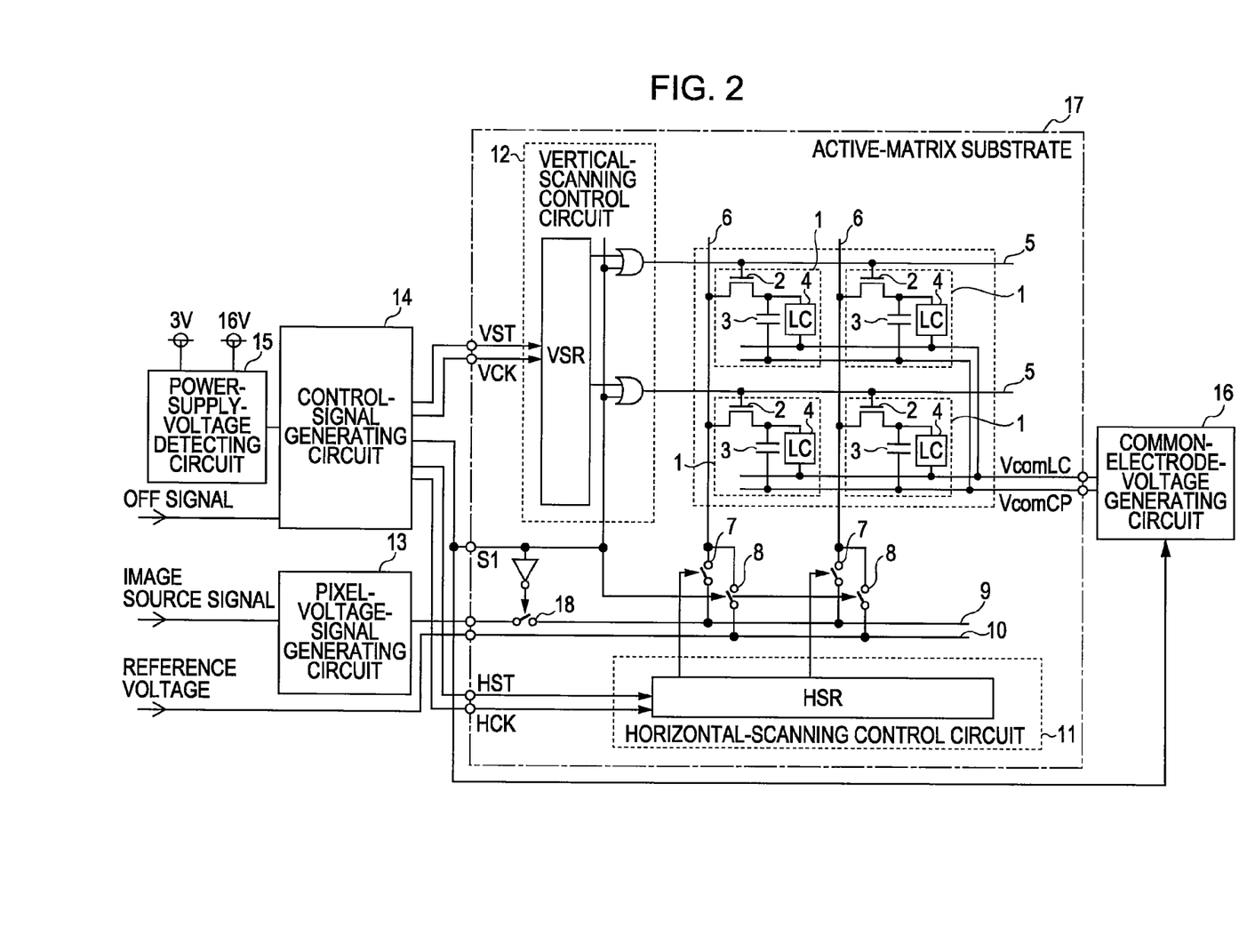
FIG. 2 is a schematic circuit diagram showing an example configuration of a liquid crystal display apparatus according to a second embodiment of the present invention.

FIG. 2 is a diagram showing an example configuration of a liquid crystal display apparatus according to a second embodiment of the present invention. The configurations of the pixels 1, the vertical scanning control circuit 12, the gate lines 5, and the circuits provided outside the active matrix substrate 17 are the same as those in the first embodiment, so that description thereof will be omitted. The following description will be directed mainly to configurations of parts that differ from parts in the first embodiment.

A main difference with the configuration of the first embodiment is that a third switch (hereinafter referred to as a disconnecting switch) 18 is provided between the transferring switches 7 and the pixel voltage signal generating circuit 13. The control terminal of the disconnecting switch 18 receives input of the control signal S1 through the inverter circuit. The control signal S1 is a signal output from the control signal generating circuit 14.

Each of the signal lines 6 is connected to a first switch (hereinafter referred to as a transferring switch) 7 and a second switch (hereinafter referred to as a discharging switch) 8. The other end of the transferring switch 7 is connected to a video line 9 that transmits pixel voltage signals, and the other end of the discharging switch 8 is connected to a reference voltage line 10. The voltage on the reference voltage line 10 serves as a reference discharged voltage at the time of discharging voltages stored at the pixel storage capacitors 3. The disconnecting switch 18 is connected between the video line 9 and the pixel voltage signal generating circuit 13.

Similarly to the first embodiment, the control terminals of all the discharging switches 8 receive input of the control signal S1 output from the control signal generating circuit 14 provided outside the active matrix substrate 17.

The control terminals of the transferring switches 7 are controlled by the horizontal scanning control circuit 11. The configuration of the horizontal scanning control circuit 11 may be the same as that in the first embodiment. Alternatively, in this embodiment, the horizontal scanning control circuit 11 may be formed using only the horizontal scanning shift register HSR.

Next, an operation according to a method of controlling the liquid crystal display apparatus of this embodiment will be described. When a sequence for discharging voltages stored at the pixel storage capacitors 3 is executed in response to an OFF signal transmitted from the main unit of the product or a signal output from the power supply voltage detecting circuit 15, the control signal generating circuit 14 pulls the control signal S1 to a high level.

According to the control signal S1, the discharging switches 8 connected to the signal lines 6 of the individual columns and the pixel transistors 2 of the individual pixels 1 are all forcibly turned on simultaneously. Furthermore, the disconnecting switch 18 is turned off (according to the control signal S1), so that pixel voltage signals are electrically disconnected in the proximity of an input terminal for the video line 9 on the active matrix substrate 17. Accordingly, voltages stored at the storage capacitors 3 of all the pixels are discharged so that the voltages are controlled to become a desired reference voltage. At the same time, the voltages VcomCP and VcomLC output from the common electrode voltage generating circuit 16 are controlled to become desired reference voltages.

With the configuration of this embodiment, even if one or more of the transferring switches 7 are ON during a horizontal scanning operation, the disconnecting switch 18 is controlled to be turned off according to the control signal S1, so that the pixel voltage signal generating circuit 13 is electrically disconnected from the signal lines 6. Therefore, the output terminal of the pixel voltage signal generating circuit 13 does not become short circuited with the reference voltage via the transferring switches 7 and the discharging switches 8. This serves to protect the pixel voltage signal generating circuit 13 from being damaged by an excessive load.

Furthermore, similarly to the first embodiment, considering the transient state during execution of the discharging sequence, it is desired that the disconnecting switch 18 be turned off before the discharging switches 8 are turned on. With this order of operation, excessive load of the pixel voltage signal generating circuit 13 can be prevented more reliably. The operation according to the above order can be implemented using schemes described in relation to the first embodiment, so that description thereof will be omitted.

Furthermore, although the vertical scanning control circuit 12 is formed of the shift register VSR and the OR circuits, without limitation to this configuration, other configurations are possible. For example, the vertical scanning control circuit 12 may be formed using a shift register having a set function, using the control signal S1 as a set signal to pull signals output from the vertical scanning control circuit 12 simultaneously to a high level.

Third Embodiment

Figure 3:
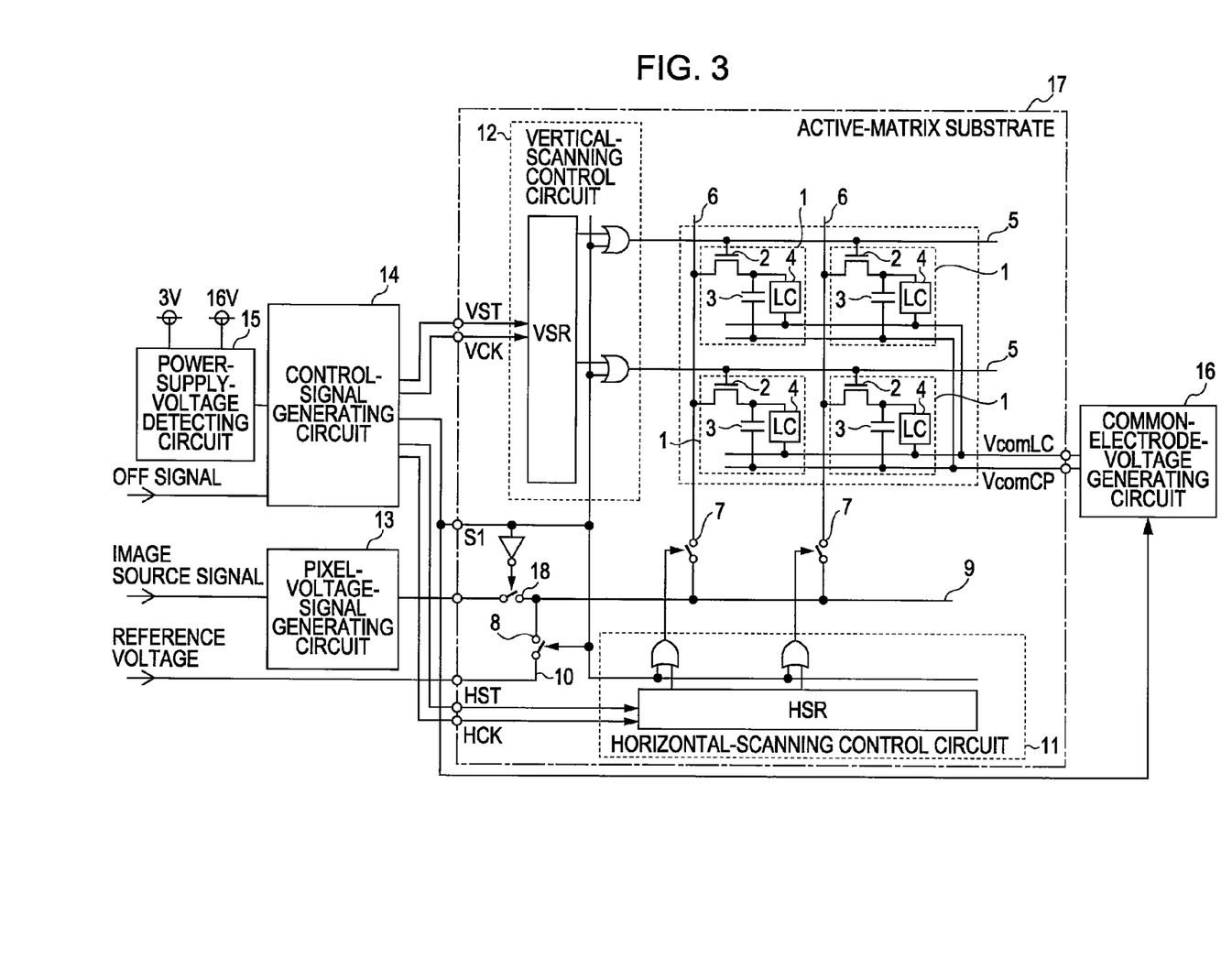
FIG. 3 is a schematic circuit diagram showing an example configuration of a liquid crystal display apparatus according to a third embodiment of the present invention.

FIG. 3 is a diagram showing an example configuration of a liquid crystal display apparatus according to a third embodiment of the present invention. Since the configurations of the pixels 1, the vertical scanning control circuit 12, the gate lines 5, and the circuits provided outside the active matrix substrate 17 are the same as those in the first embodiment, description thereof will be omitted. The following description will be directed mainly to the configurations of parts that differ from parts in the first embodiment.

Each of the signal lines 6 is connected to a first switch (hereinafter referred to as a transferring switch) 7, and the other end of the transferring switch 7 is connected to a video line 9 that transmits pixel voltage signals. The video line 9 is connected to a second switch (hereinafter referred to as a discharging switch) 8 and a third switch (hereinafter referred to as a disconnecting switch) 18.

The other end of the discharging switch 8 is connected to the reference voltage line 10. The voltage on the reference voltage line 10 serves as a reference discharged voltage at the time of discharging voltages stored at the pixel storage capacitors 3, for example, when the liquid crystal display apparatus is powered off. The other end of the disconnecting switch 18 is connected to the output terminal of the pixel voltage signal generating circuit 13.

The control terminals of the transferring switches 7 are connected to outputs of the horizontal scanning control circuit 11. The horizontal scanning control circuit 11 is formed of the horizontal scanning shift register HSR and the OR circuits. The horizontal scanning control circuit 11 receives input of the horizontal scanning start signal HST, the horizontal scanning clock signal HCK, and the control signal S1 output from the control signal generating circuit 14 provided outside the active matrix substrate 17. In the horizontal scanning control circuit 11, signals output from the horizontal scanning shift register HSR and the control signal S1 are input to the OR circuits, and signals output from the OR circuits serve as output signals of the horizontal scanning control circuit 11. The ON/OFF of the transferring switches 7 is controlled according to the output signal.

The control terminal of the discharging switch 8 receives input of the control signal S1 output from the control signal generating circuit 14. The control terminal of the disconnecting switch 18 receives input of the control signal S1 via the inverter circuit.

Next, an operation according to a method of controlling the liquid crystal display apparatus of this embodiment will be described. Similarly to the first embodiment, when a sequence for discharging voltages stored at the pixel storage capacitors 3 is executed in response to an OFF signal transmitted from the main unit of the product or a signal output from the power supply voltage detecting circuit 15, the control signal generating circuit 14 pulls the control signal S1 to a high level.

According to the control signal S1, the disconnecting switch 18 is turned off, so that pixel voltage signals are electrically disconnected in the proximity of an input terminal for the video line 9 on the active matrix substrate 17. Furthermore, the transferring switches 7 connected to the individual signal lines 6 and the pixel transistors 2 of the individual pixels 1 are all forcibly turned on simultaneously, so that the discharging switch 8 is also turned on. Accordingly, voltages stored at the storage capacitors 3 of all the pixels 1 are discharged so that the voltages are controlled to become a desired reference voltage. At the same time, the voltages VcomCP and VcomLC output from the common electrode voltage generating circuit 16 are controlled to become desired reference voltages.

With the configuration according to this embodiment, the disconnecting switch 18 is turned off according to the control signal S1, so that the pixel voltage signal generating circuit 13 is electrically disconnected from the video line 9. Thus, the output terminal of the pixel voltage signal generating circuit 13 does not become short circuited with the reference voltage. This serves to protect the pixel voltage signal generating circuit 13 from being damaged by an excessive load.

Furthermore, similarly to the first embodiment, considering the transient state during execution of the discharging sequence, it is desired that the disconnecting switch 18 be turned off before the discharging switch 8 is turned on. With this order of operation, the pixel voltage signal generating circuit 13 can be prevented from being damaged by an excessive load more reliably. The method of causing these switches to operate in the above described order can be implemented similarly to the schemes described in relation to the first embodiment, so that description thereof will be omitted.

Furthermore, although the vertical scanning control circuit 12 is formed of the shift register VSR and the OR circuits, without limitation to this configuration, other configurations are possible. For example, the vertical scanning control circuit 12 may be formed using a shift register having a set function, using the control signal S1 as a set signal to pull output signals of the vertical scanning control circuit 12 simultaneously to a high level.

Furthermore, although the horizontal scanning control circuit 11 is formed of the shift register HSR and the OR circuits, without limitation to this configuration, other configurations are possible. For example, the horizontal scanning control circuit 11 may be formed using a shift register having a set function, using the control signal S1 as a set signal to pull output signals of the horizontal scanning control circuit 11 simultaneously to a high level.

With the configuration according to this embodiment, compared with the first or second embodiment, the discharging switches 8 need not be connected to the individual signal lines 6, so that the layout can be made more compact.

If it is possible to control the output terminal of the pixel voltage signal generating circuit 13 to become a high impedance state by inputting a certain control signal from outside, it is possible to regard that the disconnecting switch 18 is included in the pixel voltage signal generating circuit 13. Thus, transmission of signals to the video line 9 may be controlled by inputting the control signal S1 or a signal correlated to the control signal S1 to the pixel voltage signal generating circuit 13.

Fourth Embodiment

Figure 4:
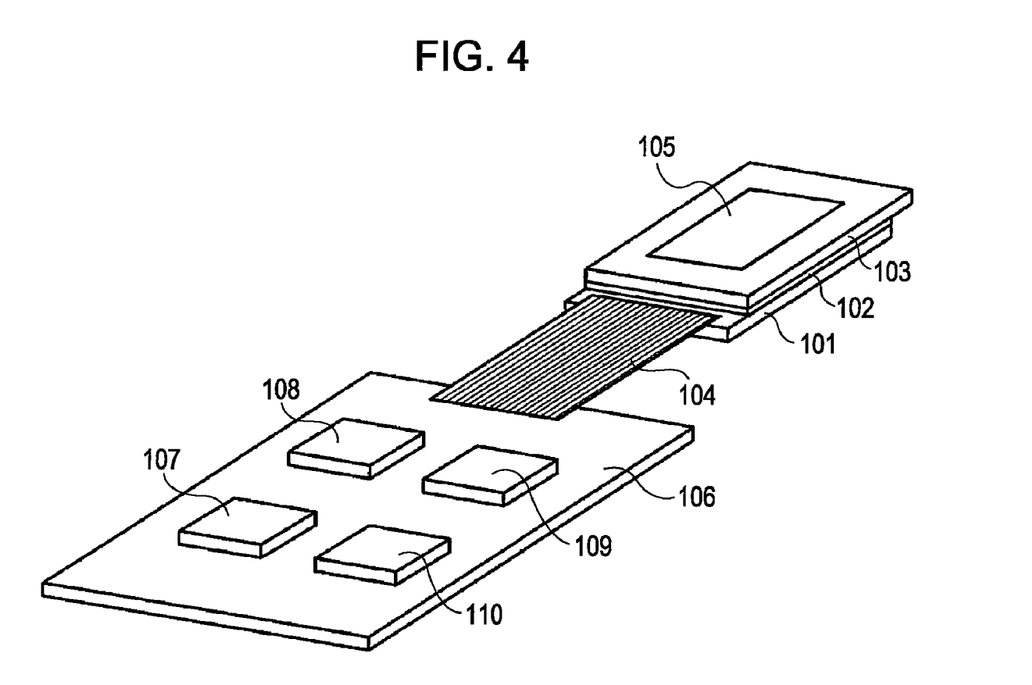
FIG. 4 is a perspective drawing showing an example configuration of a system including a liquid crystal display apparatus according to a fourth embodiment of the present invention.

FIG. 4 is a perspective view diagram showing an example configuration of a system including a liquid crystal display apparatus according to a fourth embodiment of the present invention. FIG. 4 schematically shows an example of a reflective liquid crystal display system including a liquid crystal display apparatus configured according to one of the first to third embodiments.

Referring to FIG. 4, on a silicon substrate (single crystal semiconductor substrate) 101 that serves as a liquid crystal display substrate (active matrix substrate), driving circuits and pixel portions are formed in an integrated manner. A transparent electrode (counter electrode) 103 serves as a common electrode for inversion driving of liquid crystal. Between the silicon substrate 101 and the transparent electrode 103, a sealing agent 102 is provided so as to surround a display area 105. A liquid crystal layer is formed in a space defined by the silicon substrate 101, the sealing agent 102, and the transparent electrode 103.

Furthermore, along one side among the four sides of the silicon substrate 101, pads for power supply voltages and various signals are provided in a concentrated manner, and a flexible wire cable 104 is connected to the pads. Through this flexible wire cable 104, power supply voltages and various signals are input. It is because of reasons for convenience of mounting and cost that all the pads for signals and power supply voltages are provided along one side of the silicon substrate 101.

On a driving substrate (external driving circuit substrate) 106, ICs needed for driving the active matrix substrate 101 are mounted. A timing generator IC 107 generates control signals such as clock signals. A driver IC 108 generates pixel voltage signals on the basis of image source signals. A voltage generating IC 109 generates reference voltages used on the active matrix substrate 101. A detecting IC 110 detects reduction in power supply voltages. In the configuration shown in FIG. 4, four ICs are mounted on the driving circuit substrate 106. However, without limitation to this configuration, some of the ICs may be integrated together.

Driving circuits, such as scanning circuits, and pixel electrodes are formed on the same silicon substrate 101, so that a reflective liquid crystal display apparatus integrated with driving circuits is formed. Such a reflective liquid crystal display apparatus in which a single crystal semiconductor substrate is used as a device substrate is called LCOS (Liquid Crystal On Silicon).

The first to third embodiments can also be applied to the liquid crystal display apparatus in this embodiment.

Fifth Embodiment

Figure 5:
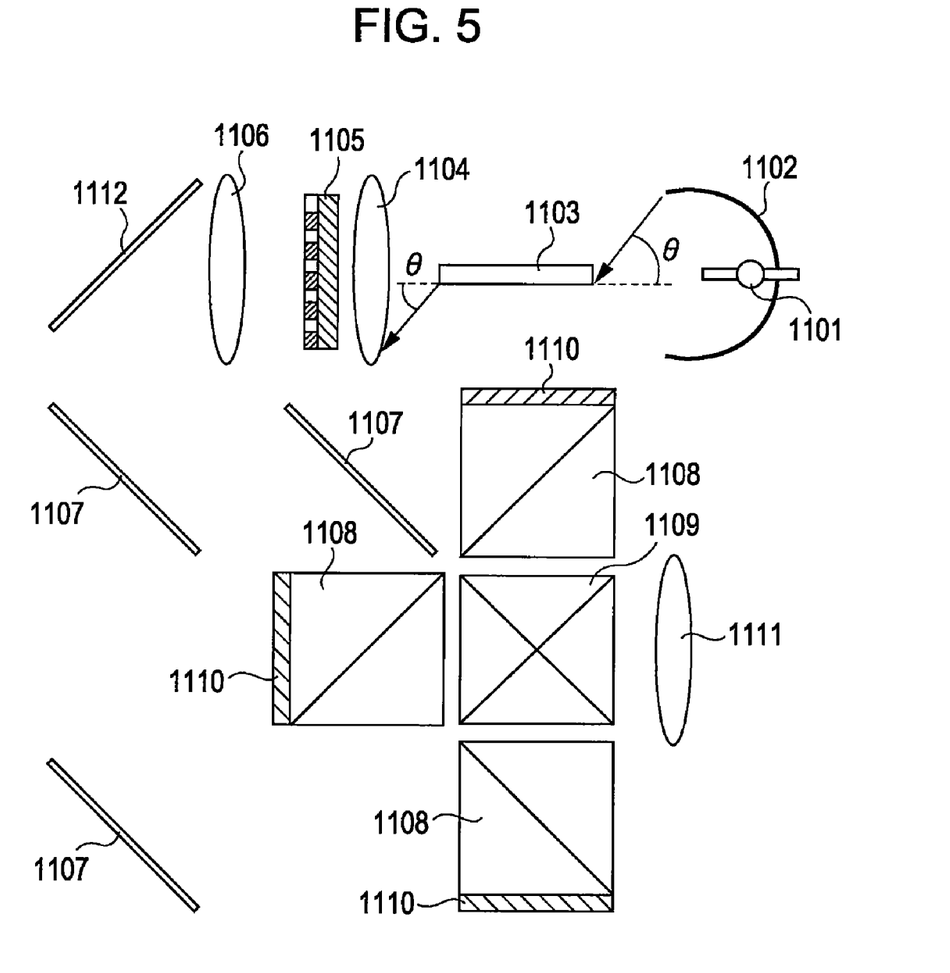
FIG. 5 is a diagram showing an example configuration of a liquid crystal projector system according to a fifth embodiment of the present invention.

FIG. 5 is a diagram showing an example configuration of a liquid crystal projector optical system according to a fifth embodiment of the present invention, including reflective liquid crystal display apparatuses implemented using active matrix substrates. The system includes a lamp (light source) 1101, a reflector 1102, a rod integrator 1103, a collimator lens 1104, a polarization converting system 1105, a relay lens 1106, three dichroic mirrors 1107, three polarizing beam splitters 1108, a cross prism 1109, three reflective liquid crystal panels 1110 implemented using active matrix substrates according to one of the first to third embodiments, a projecting lens 1111, and a total reflection mirror 1112.

Light flux output from the lamp 1101 is reflected by the reflector 1102 and is thereby condensed at the entry of the integrator 1103. The reflector 1102 is an elliptical reflector having its foci at the lamp 1101 and the entry of the integrator 1103. The light flux having entered the integrator 1103 repeats reflection 0 to several times within the integrator 1103, thereby forming a secondary light source image at the exit of the integrator 1103. Although a secondary light source can be formed using a fly's eye lens, such a method will not be described herein. The light flux from the secondary light source becomes substantially parallel through the collimator lens 1104, and the parallel light enters a polarizing beam splitter of the polarization converting system 1105. Of the incident light, a P wave component is reflected by the polarizing beam splitter and becomes an S wave component through a λ/2 plate, whereby all the light becomes an S wave and enters the relay lens 1106. The light flux is condensed at the liquid crystal panels 1110 by the relay lens 1106. While the light flux is being condensed at the liquid crystal panels 1110, the light is separated into color components by the dichroic mirrors 1107, a polarizer (not shown), the polarizing beam splitters 1108, the cross prism 1109, and so forth, so that S waves of the color components individually enter the three liquid crystal panels 1110. In the liquid crystal panels 1110, liquid crystal shutters control voltages for individual pixels in accordance with images to be displayed. Typically, the operation of the liquid crystal modulates the S waves into elliptically polarized light (or linearly polarized light), P wave components transmit through the polarizing beam splitter 1108, color components are combined by the cross prism 1109, and the combined light is projected through the projecting lens 1111.

With the liquid crystal apparatuses and methods for controlling the same according to the first to fifth embodiments, the output of the pixel voltage signal generating circuit 13 does not become short circuited with a desired reference voltage, so that the pixel voltage signal generating circuit 13 is prevented from being damaged. Furthermore, voltages stored at the pixel storage capacitors 3 can be discharged quickly to a desired voltage. This serves to prevent reduction of the lifetime (reliability) of the liquid crystal.

In a display area 105 (shown in FIG. 4), a plurality of pixels 1 are arranged to form a matrix, each of the pixels 1 having a switching element (pixel transistor) 2 and an electrode connected to a first terminal (drain) of the switching element. A first scanning circuit (vertical scanning control circuit) 13 controls whether the switching elements 2 are turned on or off via first wires (gate lines) 5. A second scanning circuit (horizontal scanning control circuit) 11 controls whether the image signal generating circuit (pixel voltage signal generating circuit) 13 that generates image signals is electrically connected to or disconnected from second wires (signal lines) 6, and assigns the image signals to the pixels 1 via the second wires 6. A discharging element 8 serves to discharge the image signals assigned to the pixels 1. A detecting circuit (power supply voltage detecting circuit) 15 detects reduction in a power supply voltage and outputs a detection signal. A control circuit (control signal generating circuit) 14 performs a controlling operation according to the detection signal. More specifically, the control circuit 14 performs a controlling operation according to the detection signal so that the image signal generating circuit 13 is electrically disconnected from the second wires 6, the switching elements 2 are turned on, and the discharging element 8 is caused to operate.

The liquid crystal display apparatus may further include a third wire (video line) 9 provided between the image signal generating circuit 13 and the second wires 6; and a first switch (transferring switch) 7 provided between the second wires 6 and the third wire 9.

The discharging element 8 may be a second switch having two terminals, one being connected to the second wires 6 and the other being connected to a power supply line (reference voltage line) 10 through which a reference voltage is supplied, and the control circuit 14 may turn on the second switch 8 according to the detection signal.

The control circuit 14 may turn off the first switch 7 according to the detection signal.

The liquid crystal display apparatus may further include a third switch (disconnecting switch) 18 provided between the image signal generating circuit 13 and the third wire 9, and the control circuit 14 may turn off the third switch 18 according to the detection signal.

The discharging element 8 may be a second switch having two terminals, one being connected to the third wire 9 between the first switch 7 and the third switch 18 and the other being connected to a power supply line (reference voltage line) 10 through which a reference voltage is supplied, and the control circuit 14 may turn on the second switch 8 according to the detection signal.

The control circuit 14 may turn on the switching elements 2 and cause the discharging element 8 to operate after the image signal generating circuit 13 becomes electrically disconnected from the second wires 6.

The liquid crystal display apparatus may further include a voltage supplying circuit (common electrode voltage generating circuit) 16 configured to supply a predetermined reference voltage to one terminal of each of a plurality of capacitors (pixel storage capacitors) 3 that hold the image signals, the capacitors 3 being provided individually for the pixels 1, and the control circuit 14 may cause the voltage supplying circuit 16 to supply the reference voltage to the one terminal according to the detection signal.

The liquid crystal projector system shown in FIG. 5 includes the liquid crystal display apparatuses (reflective liquid crystal panels) 1110 according to one of the first to third embodiments; and a light source (lamp) 1101 configured to emit light toward the liquid crystal display apparatuses 1110, and light reflected from the liquid crystal display apparatuses 1110 is projected.

Except as otherwise disclosed herein, the various components shown in outline or in block form in the figures are individually well-known and their internal construction and operation are not critical either to the making or using of this invention or to a description of the best mode of the invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-113271 filed Apr. 23, 2007, which is hereby incorporated by reference herein in its entirety.

What is claimed is:

1. A liquid crystal display apparatus comprising:
a display area in which a plurality of pixels are arranged to form a matrix, each of the pixels comprising a switching element and an electrode connected to a first terminal of the switching element;
a first scanning circuit configured to control whether the switching elements of the pixels are turned on or off via a plurality of first wires;
a second scanning circuit configured to control whether an image signal generating circuit that generates image signals is electrically connected to or disconnected from a plurality of second wires, and to assign the image signals to the pixels via the second wires;
a discharging element configured to discharge the image signals assigned to the pixels;
a detecting circuit configured to detect a reduction in a power supply voltage and to output a detection signal;
a third wire provided between the image signal generating circuit and the second wires;
a first switch provided between the second wires and the third wire;
a third switch provided between the image signal generating circuit and the third wire; and
a control circuit configured to perform a controlling operation according to the detection signal so that the image signal generating circuit is electrically disconnected from the second wires, the switching elements are turned on, and the discharging element is caused to operate, wherein the control circuit turns off the third switch according to the detection signal.

2. The liquid crystal display apparatus according to claim 1, wherein the discharging element is a second switch having two terminals, one being connected to the third wire between the first switch and the third switch and the other being connected to a power supply line through which a reference voltage is supplied, and wherein the control circuit turns on the second switch according to the detection signal.

3. The liquid crystal display apparatus according to claim 1, wherein the control circuit turns on the switching elements and causes the discharging element to operate after the image signal generating circuit becomes electrically disconnected from the second wires.

4. The liquid crystal display apparatus according to claim 1, further comprising a voltage supplying circuit configured to supply a predetermined reference voltage to one terminal of each of a plurality of capacitors that hold the image signals, the capacitors being provided individually for the pixels, wherein the control circuit causes the voltage supplying circuit to supply the reference voltage to the one terminal according to the detection signal.

5. A liquid crystal projector system comprising:
liquid crystal display apparatus according to claim 1; and
a light source configured to emit light toward the liquid crystal display apparatus,
wherein light reflected from the liquid crystal display apparatus is projected.

6. A method of controlling a liquid crystal display apparatus including (a) a display area in which a plurality of pixels are arranged to form a matrix, each of the pixels comprising a switching element and an electrode connected to a first terminal of the switching element; (b) a first scanning circuit configured to control whether the switching elements of the pixels are turned on or off via a plurality of first wires; (c) a second scanning circuit configured to control whether an image signal generating circuit that generates image signals is electrically connected to or disconnected from a plurality of second wires, and to assign the image signals to the pixels via the second wires; (d) a discharging element configured to discharge the image signals assigned to the pixels; and (e) a detecting circuit configured to detect a reduction in a power supply voltage and to output a detection signal, (f) a third wire provided between the image signal generating circuit and the second wires, (g) a first switch provided between the second wires and the third wire, and (h) a third switch provided between the image signal generating circuit and the third wire, the method comprising:
a control step of performing a controlling operation according to the detection signal so that the image signal generating circuit is electrically disconnected from the second wires by turning off the third switch, the switching elements are turned on, and the discharging element is caused to operate.

7. The method according to claim 6, wherein, in the control step, the switching elements are turned on and the discharging element is caused to operate after the image signal generating circuit becomes electrically disconnected from the second wires.

* * * * *